(12) United States Patent
Nagatsu et al.

(10) Patent No.: US 11,208,968 B2
(45) Date of Patent: Dec. 28, 2021

(54) ENGINE SYSTEM

(71) Applicant: Mazda Motor Corporation, Hiroshima (JP)

(72) Inventors: Kazuhiro Nagatsu, Aki-gun (JP); Hirotaka Suzuki, Aki-gun (JP); Yuji Harada, Aki-gun (JP); Hiroyuki Yamashita, Aki-gun (JP); Ryohei Ono, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/130,993

(22) Filed: Dec. 22, 2020

(65) Prior Publication Data

US 2021/0222643 A1  Jul. 22, 2021

(30) Foreign Application Priority Data

Jan. 21, 2020  (JP) .............................. JP2020-007564

(51) Int. Cl.
*F02D 41/40* (2006.01)
*F02B 19/08* (2006.01)
*F02D 41/38* (2006.01)

(52) U.S. Cl.
CPC .......... *F02D 41/401* (2013.01); *F02B 19/08* (2013.01); *F02D 2041/389* (2013.01); *F02D 2200/10* (2013.01); *F02D 2200/60* (2013.01)

(58) Field of Classification Search
CPC ............... F02D 41/401; F02D 2200/10; F02D 2200/60; F02D 2041/389; F02B 19/08
USPC ............... 123/269, 276, 298, 301, 306, 436; 701/103–105, 110
See application file for complete search history.

(56) References Cited

U.S. PATENT DOCUMENTS

2018/0266307 A1   9/2018  Muto

FOREIGN PATENT DOCUMENTS

JP        2018155149 A        10/2018

*Primary Examiner* — Hai H Huynh
(74) *Attorney, Agent, or Firm* — Alleman Hall Creasman & Tuttle LLP

(57) ABSTRACT

An engine system includes an engine, a main combustion chamber formed by a cylinder head and a piston, an auxiliary chamber formed with a communicating hole communicating with the main combustion chamber, an injector configured to inject fuel into the main combustion chamber, an ignition plug provided to the auxiliary chamber and configured to ignite a mixture gas inside the auxiliary chamber, an accelerator opening sensor, and a control device. The control device controls the injector so that an air-fuel ratio of the mixture gas inside the auxiliary chamber becomes a first air-fuel ratio when an engine load range is a first range, and the air-fuel ratio of the mixture gas inside the auxiliary chamber becomes a second air-fuel ratio leaner than the first air-fuel ratio when the engine load range is a second range where the engine load is higher than in the first range.

12 Claims, 10 Drawing Sheets

ENGINE SYSTEM

TECHNICAL FIELD

The present disclosure relates to an engine system, and particularly to the engine system including an engine, a main combustion chamber, an auxiliary chamber where a communicating hole communicating with the main combustion chamber is formed, an ignition plug, an injector, and a control device which controls the injector.

BACKGROUND OF THE DISCLOSURE

Conventionally, an art for engines (internal combustion engines) is known, in which an auxiliary chamber is provided to a main combustion chamber, and accelerates a combustion propagation inside the main combustion chamber by making flame blow off into the main combustion chamber from a communicating hole of the auxiliary chamber to improve thermal efficiency of the engine.

For example, JP2018-155149A discloses an art in which a fuel injection valve and an ignition plug are provided to an auxiliary chamber, fuel is injected into the auxiliary chamber in an intake stroke and a compression stroke to form a rich mixture gas inside the auxiliary chamber before an ignition timing, and the rich mixture gas is then ignited. Therefore, flame is injected from the communicating holes into a main combustion chamber to achieve lean combustion inside the main combustion chamber.

However, the engine load varies according to the torque demanded by a driver (operator). While the engine load is high, when a mixture gas inside the auxiliary chamber is ignited in the rich state, the combustion propagation inside the auxiliary chamber becomes quicker, and therefore, dramatically powerful flame blows off from the communicating holes.

Here, the present inventors acquired the knowledge during the R&D process of the engine that when the auxiliary chamber is used in order to improve thermal efficiency, the diameter of the communicating hole formed in the auxiliary chamber cannot be made variable according to the engine load. Therefore, when the engine load is high, the flame powerfully blows off from the communicating hole of the auxiliary chamber, even if the mixture gas inside the auxiliary chamber is rich ($\lambda<1$) or is the stoichiometric air-fuel ratio ($\lambda=1$), and as a result, a special abnormal combustion causing high frequency oscillation inside the main combustion chamber occurs.

This abnormal combustion is not caused by a so-called pre-ignition in which the mixture gas is ignited excessively early near a top dead center of a compression stroke, but is caused by the combustion propagation inside the main combustion chamber becoming abnormally quick due to the flame powerfully blew off from the auxiliary chamber, which abruptly increases the combustion pressure inside the main combustion chamber. This combustion gives the piston a high combustion pressure, and a pipe resonance at high frequency is excited inside the cylinder between the cylinder head and the piston (the main combustion chamber). Therefore, a phenomenon in which a high-frequency resonance (for example, near 1.5 kHz, 3 to 4 kHz, and 6 to 7 kHz) acts on the combustion pressure occurs. The abnormal combustion at the high frequency becomes an exciting force which excites the cylinder block around the combustion chamber, which causes vibration and noise which are not normally produced in the combustion of the engine.

SUMMARY OF THE DISCLOSURE

Therefore, the present disclosure is made in order to solve the problem, and one purpose thereof is to provide an engine system which can suppress abnormal combustion inside a main combustion chamber of an engine provided with an auxiliary chamber.

According to one aspect of the present disclosure, an engine system is provided, which includes an engine having a cylinder head and a piston, a main combustion chamber formed by the cylinder head and the piston, an auxiliary chamber provided to the main combustion chamber and formed with a communicating hole communicating with the main combustion chamber, an injector provided to the engine and configured to inject fuel into the main combustion chamber, an ignition plug provided to the auxiliary chamber and configured to ignite mixture gas inside the auxiliary chamber, an accelerator opening sensor configured to detect an accelerator opening, and a control device configured to control the injector in response to an output signal from the accelerator opening sensor. The control device includes a processor configured to execute a driver demanded torque determining module to determine a demanded torque of a driver based on the accelerator opening detected by the accelerator opening sensor, an engine load determining module to determine a load of the engine based on the driver's demanded torque determined by the driver demanded torque determining module, and an engine load range determining module to determine whether the engine load determined by the engine load determining module is within a given load range. The control device controls the injector so that an air-fuel ratio of the mixture gas inside the auxiliary chamber becomes a first air-fuel ratio, when the engine load range determined by the engine load range determining module is a first load range, and the air-fuel ratio of the mixture gas inside the auxiliary chamber becomes a second air-fuel ratio leaner than the first air-fuel ratio, when the engine load range determined by the engine load range determining module is a second load range where the engine load is higher than in the first load range.

According to this configuration, the mixture gas inside the auxiliary chamber is made leaner in the second load range of the engine, than in the first load range where the engine load is lower than in the second load range. Accordingly, when the engine load is high (in the second load range), the flame propagation after the ignition of the mixture gas flowed into the auxiliary chamber becomes slower, and the momentum of the flame blown off from the communicating hole of the auxiliary chamber becomes weaker as the flame propagation becomes slower. Therefore, the combustion propagation inside the main combustion chamber can be made slower by the flame blown off from the communicating hole of the auxiliary chamber, thereby suppressing abnormal combustion inside the main combustion chamber.

The control device may control the injector in the second load range so that a fuel injection timing of the injector is retarded as the engine load increases. According to this configuration, in the second load range, the fuel injection timing of the injector is retarded as the engine load increases. Accordingly, the time required for mixing the fuel injected into the main combustion chamber by the injector with the air inside the main combustion chamber becomes shorter, and therefore, when the engine load is high (in the second load range), the mixture gas which flows into the auxiliary chamber through the communicating hole can be made leaner. Therefore, when the engine load is high, the mixture gas inside the auxiliary chamber can effectively be made leaner.

The control device may control the injector so that fuel is injected only during an intake stroke in the first load range, and fuel is injected dividedly during an intake stroke and a compression stroke in the second load range. According to this configuration, the fuel injection amount during the intake stroke in the second load range can be made less than the fuel injection amount during the intake stroke in the first load range where the engine load is lower than in the second load range, because of the divided injection. Therefore, it is easier to make the mixture gas which flows into the auxiliary chamber through the communicating hole in the compression stroke leaner, when the engine load is high (in the second load range). Therefore, in the high load range of the engine (the second load range), the mixture gas inside the auxiliary chamber can effectively be made leaner.

The control device may control the injector in the second load range so that the fuel injection timing in the compression stroke by the injector is retarded as the engine load increases. According to this configuration, the fuel injection timing by the injector during the compression stroke when the engine load is high (in the second load range) is retarded than when the engine load is low (in the first load range). Accordingly, the time required for mixing the fuel injected by the injector during the compression stroke with the air inside the main combustion chamber becomes shorter by the retarded amount, and therefore, the mixture gas which flows into the auxiliary chamber through the communicating hole can be made leaner.

The engine may include a swirl control valve configured to generate a swirl inside the main combustion chamber. The auxiliary chamber may be provided to a center area of the main combustion chamber in a plan view. The control device may control the swirl control valve so that a flow of the swirl inside the main combustion chamber becomes stronger in the second load range than in the first load range. According to this configuration, the swirl control valve is controlled so that the swirl flow inside the main combustion chamber becomes stronger in the second load range than in the first load range. Therefore, the mixture gas which flows into the auxiliary chamber provided to the center area of the main combustion chamber can be made leaner more effectively in the high load range of the engine (the second load range) than in the low load range (the first load range). That is, the mixture gas flows in the part radially outward of the main combustion chamber as the swirl flow inside the main combustion chamber becomes stronger, and it becomes difficult for the mixture gas to flow through the center area of the main combustion chamber. Accordingly, the mixture gas which flows into the auxiliary chamber provided to the center area of the main combustion chamber can effectively be made leaner.

The auxiliary chamber having an auxiliary ignition plug may be provided to the main combustion chamber and may combust the mixture gas inside the auxiliary chamber independently from the main combustion chamber. The control device may control the auxiliary ignition plug to ignite the mixture gas inside the auxiliary chamber so that flame propagation combustion of the mixture gas occurs. The combustion propagation generated inside the auxiliary chamber may be blown off and radiated into the main combustion chamber as flame.

BRIEF DESCRIPTION OF DRAWINGS

FIG. 4A is a partial cross-sectional view illustrating an auxiliary chamber and an auxiliary ignition plug of the pre-chamber plug, when seen from the side, and FIG. 4B is a plan view illustrating the auxiliary chamber of the pre-chamber plug when seen from below in the axial direction.

DETAILED DESCRIPTION OF THE DISCLOSURE

Hereinafter, an engine system according to one embodiment of the present disclosure is described with reference to the accompanying drawings.

Figure 1:
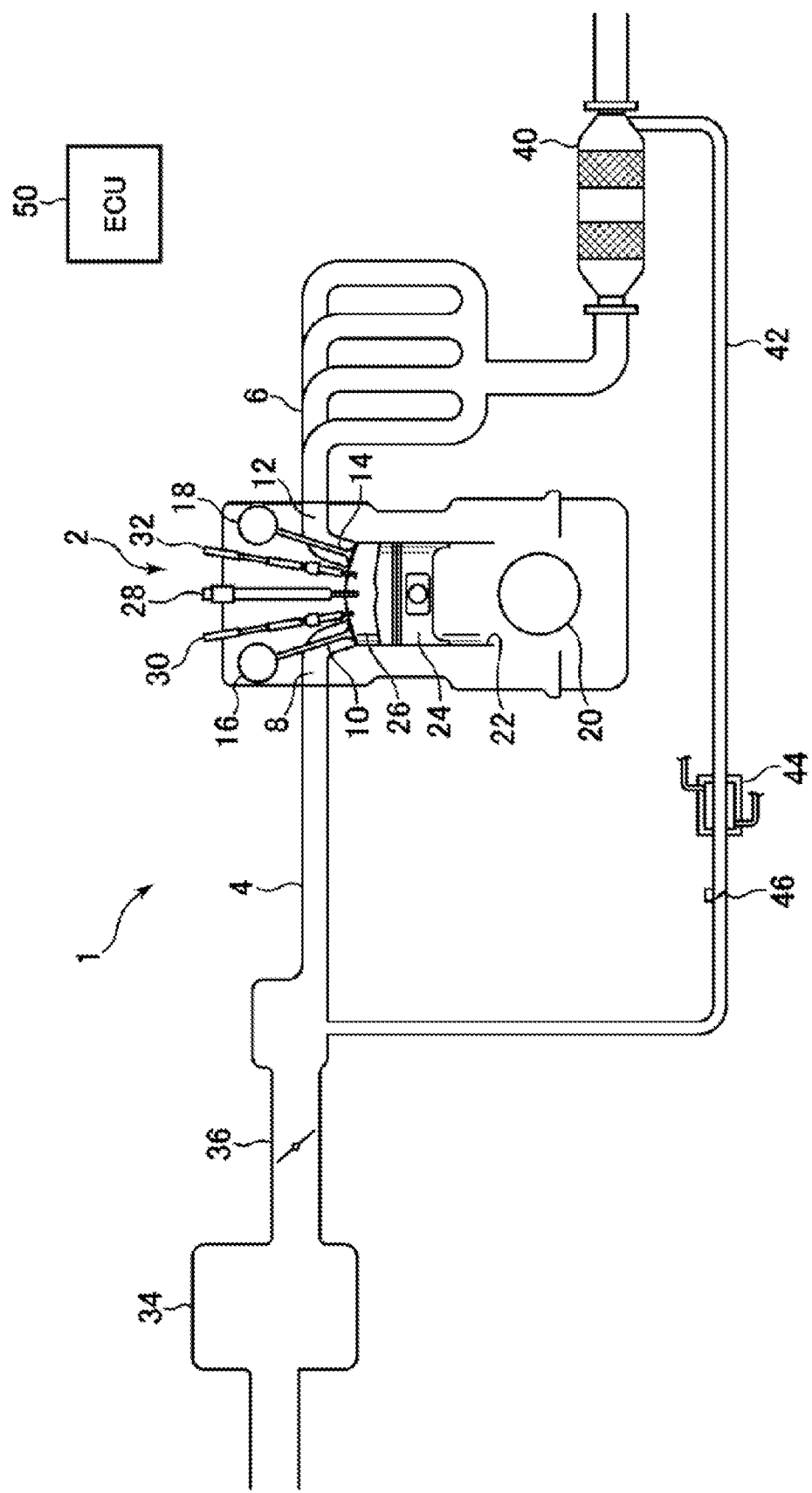
FIG. 1 is a view schematically illustrating an engine system according to one embodiment of the present disclosure.

First, referring to FIG. 1, an outline configuration of an engine system according to this embodiment of the present disclosure is described. FIG. 1 is a view schematically illustrating the engine system according to this embodiment of the present disclosure.

As illustrated in FIG. 1, an engine system 1 includes a multi-cylinder (in this embodiment, four-cylinder) engine (internal combustion engine) 2 which combusts a mixture gas comprised of intake air and fuel to generate a propelling force of a vehicle, an intake passage 4 for introducing intake air into the engine 2, and an exhaust passage 6 for discharging exhaust gas from the engine 2. Note that the present disclosure is not limited to the four-cylinder engine, and is applicable to other engines (e.g., six-cylinder engines).

Each cylinder of the engine 2 is provided with an intake port 8 which is connected to the intake passage 4 and is formed in a cylinder head 54 (see FIG. 2) which will be described later, an intake valve 10 provided to the intake port 8, an exhaust port 12 which is connected to the exhaust passage 6 and is formed in the cylinder head 54, and an exhaust valve 14 provided to the exhaust port 12. The intake valve 10 is provided with a variable valve lift mechanism (Sequential Valve Timing) 16 which electrically operates the intake valve 10 to variably control a lift amount and opening and closing timings of the intake valve 10. Similarly, the exhaust valve 14 is provided with a variable valve lift mechanism 18 which variably operates a lift amount and opening and closing timings of the exhaust valve 14.

Figure 2:
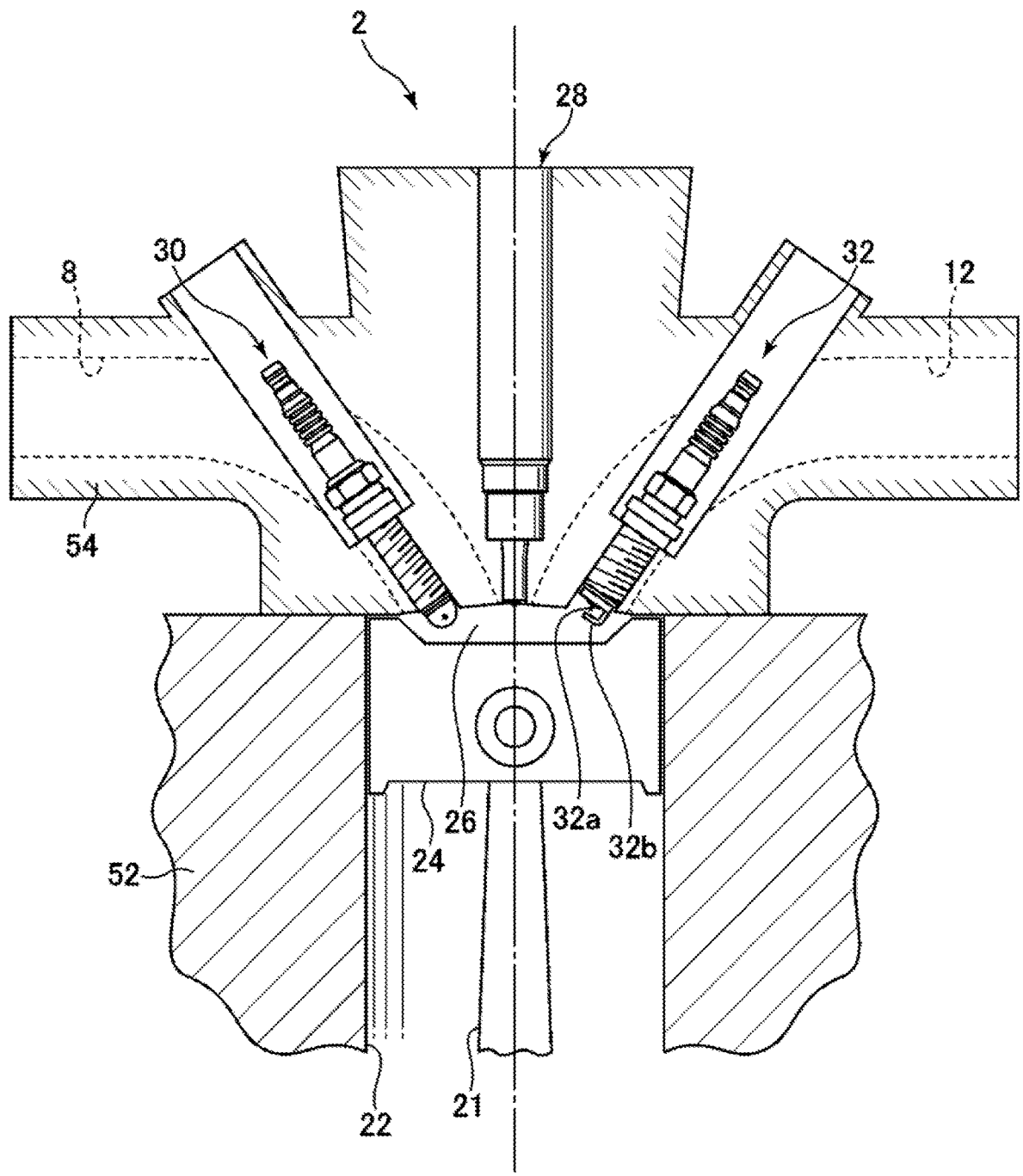
FIG. 2 is a cross-sectional view schematically illustrating a configuration around a main combustion chamber formed in a cylinder of an engine in the engine system according to this embodiment.

The engine 2 is provided with a piston 24 which reciprocates inside a cylinder 22 in connection with rotation of a crankshaft 20, and a combustion chamber (main combustion chamber) 26 is formed by the piston 24 and the cylinder head 54 (see FIG. 2). The main combustion chamber 26 is provided with an injector 28 which injects fuel into the main combustion chamber 26, a pre-chamber plug 30 (described later), and a main ignition plug 32 so that they face the main combustion chamber 26.

An air cleaner 34, a throttle valve (intake choke valve) 36 which electrically operates and adjusts an amount of intake air passing therethrough based on a demanded fuel injection amount according to an accelerator opening, and a command signal from an electronic control unit (ECU) 50 (described later), and a surge tank which temporarily stores intake air to be supplied to the engine 2 are provided at upstream location of the intake passage 4. A three-way catalyst 40 which purifies exhaust gas is provided at a downstream location of the exhaust passage 6. Moreover, an exhaust gas recirculation (EGR) passage 42 which recirculates a portion of exhaust gas which passed the three-way catalyst 40 to the intake passage 4 is connected to the exhaust passage 6. The EGR passage 42 is provided with an EGR cooler 44, and an EGR valve 46 which controls a flow rate of exhaust gas flowing through the EGR passage 42.

Moreover, the engine system 1 has the ECU (Electronic Control Unit) 50 which controls the engine 2. The ECU 50 is an example of "a control device for an engine" in the present disclosure, and in this embodiment, it controls operation of the engine 2 (a fuel injection timing, an ignition timing, an air-fuel ratio, etc.) based on output signals from various sensors (not illustrated) which will be described later. In detail, controls of the fuel injection timing of the injector 28, and the ignition timings of the ignition plugs 30 and 32, which will be described below, are performed by circuitry inside the ECU 50.

Figure 3:
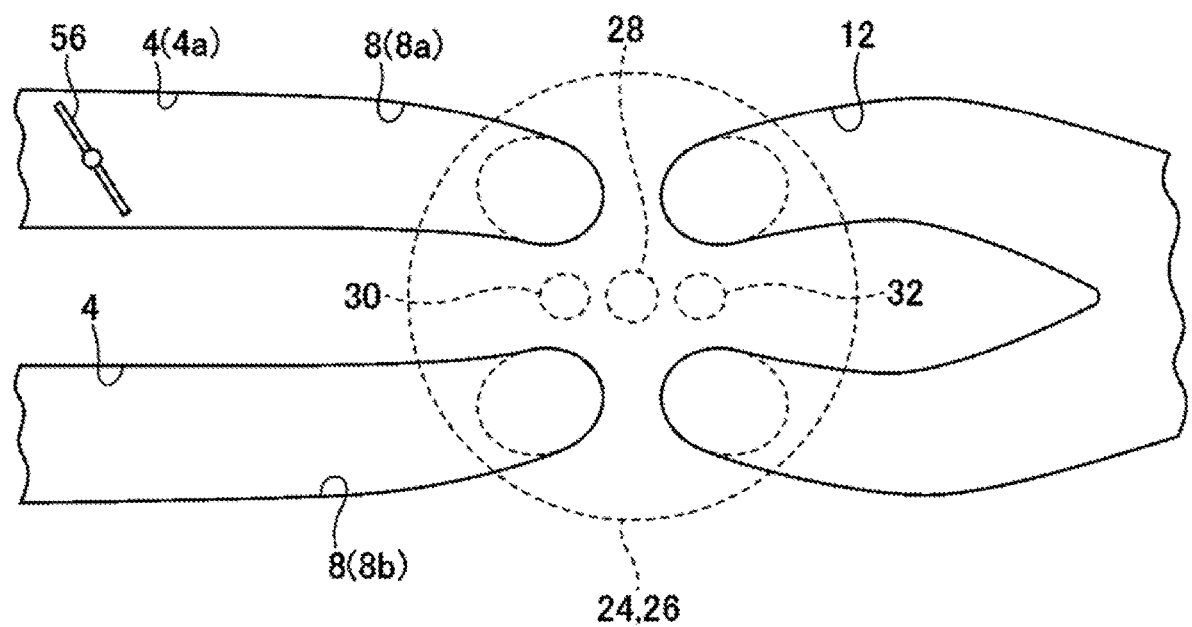
FIG. 3 is a plan view schematically illustrating the configuration around the main combustion chamber formed in the cylinder of the engine in the engine system according to this embodiment, when seen from above in a cylinder-axis direction.

Next, FIGS. 2 and 3 schematically illustrate a configuration around the main combustion chamber 26 of the engine 2. FIG. 2 is a cross-sectional view schematically illustrating a configuration around the main combustion chamber formed in the cylinder of the engine according to this embodiment, and FIG. 3 is a plan view schematically illustrating a configuration around the main combustion chamber formed in the cylinder of the engine according to this embodiment, when seen from above in the cylinder-axis direction. Note that, in FIGS. 2 and 3, a configuration around the main combustion chamber of one of the plurality of cylinders is schematically illustrated. Other cylinders are constructed similarly.

First, as illustrated in FIG. 2, the engine 2 includes a cylinder block 52 and the cylinder head 54. The cylinder 22 is formed in the cylinder block 52. A connecting rod 21 coupled to the crankshaft 20 is connected to the piston 24 provided inside the cylinder 22 so that the piston 24 reciprocates inside the cylinder 22.

Next, as illustrated in FIGS. 2 and 3, two independent intake ports 8 (8a and 8b) and two independent exhaust ports 12 are formed in the cylinder head 54 for every cylinder 22. Although illustration is omitted in FIGS. 2 and 3, the intake valve 10 and the exhaust valve 14 which are described above are provided to each of the intake ports 8a and 8b and the exhaust ports 12 so as to open and close the opening at the main combustion chamber 26 side.

An intake passage 4a connected to one of the two intake ports 8a and 8b (intake port 8a) is provided with a swirl control valve 56 which adjusts opening of the intake passage 4a. In the main combustion chamber 26, a swirl flow with strength according to the opening of the swirl control valve 56 is generated. The swirl flow of the mixture gas which circles inside the main combustion chamber 26 becomes easier to flow radially outward of the main combustion chamber 26 and the piston 24 as the swirl flow becomes stronger.

Next, as illustrated in FIG. 2, the injector 28, the pre-chamber plug 30, and the main ignition plug 32 are attached to the cylinder head 54. As illustrated in FIGS. 2 and 3, the injector 28 is provided on the cylinder axis and is provided so as to face a center part of the main combustion chamber 26, when the main combustion chamber 26 is seen from above.

Moreover, the pre-chamber plug 30 is provided at the intake port 8 side of the injector 28, and as illustrated in FIG. 2, it is disposed so as to extend obliquely downward from the intake port 8 side and face the main combustion chamber 26. In this embodiment, as illustrated in FIG. 3, a tip-end part of the pre-chamber plug 30 facing the main combustion chamber 26 (a broken-line part illustrated by "30" in FIG. 3) is provided at the middle position of the two intake ports 8a and 8b in the plan view. Note that the tip-end part of the pre-chamber plug 30 is provided with an auxiliary chamber 60 and an auxiliary ignition plug 62, which will be described later.

Thus, in this embodiment, the auxiliary chamber 60 and the auxiliary ignition plug 62 are provided at the intake port 8 side, so that it is prevented that the auxiliary chamber 60 receives heat of exhaust gas, and thus, the temperature inside the auxiliary chamber 60 excessively increases. Therefore, it is suppressed that combustion propagation inside the auxiliary chamber 60 becomes quicker, and in connection with this, flame blown off from communicating holes 66 to the main combustion chamber 26 becomes strong.

Moreover, in this embodiment, as illustrated in FIGS. 2 and 3, the tip-end part of the pre-chamber plug 30 is provided in a center area which is inward of an area radially outward of the main combustion chamber 26 (an area at least radially outward of the openings of the intake and exhaust ports 8 and 12).

Moreover, the main ignition plug 32 is provided at the exhaust port 12 side of the injector 28, and as illustrated in FIG. 2, the main ignition plug 32 is disposed so that it extends obliquely downward from the exhaust port 12 side and faces the main combustion chamber 26. In this embodiment, as illustrated in FIG. 3, the tip-end part of the main ignition plug 32 facing the main combustion chamber 26 is provided at the middle position of the two exhaust ports 12 in the plan view. Note that a broken-line part illustrated by "32" in FIG. 3 indicates a position of a center electrode 32a and a side electrode (ground) 32b in the tip-end part of the main ignition plug 32 (see FIG. 2).

Figure 4A:
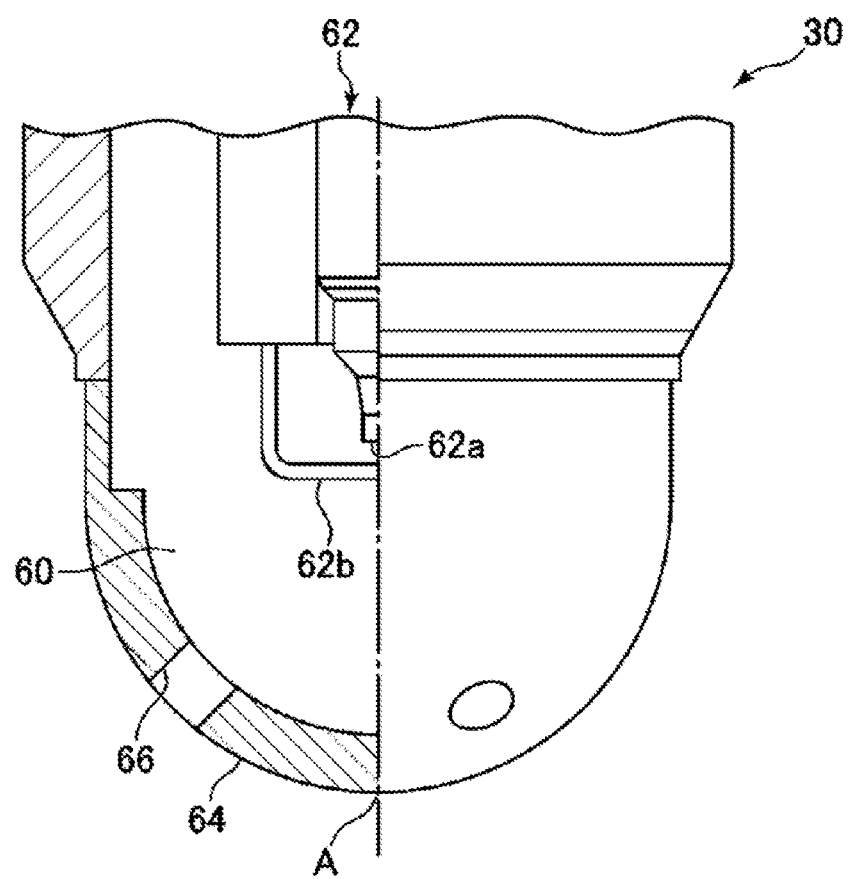
FIGS. 4A and 4B are views illustrating a pre-chamber plug according to this embodiment, where
Figure 4B:
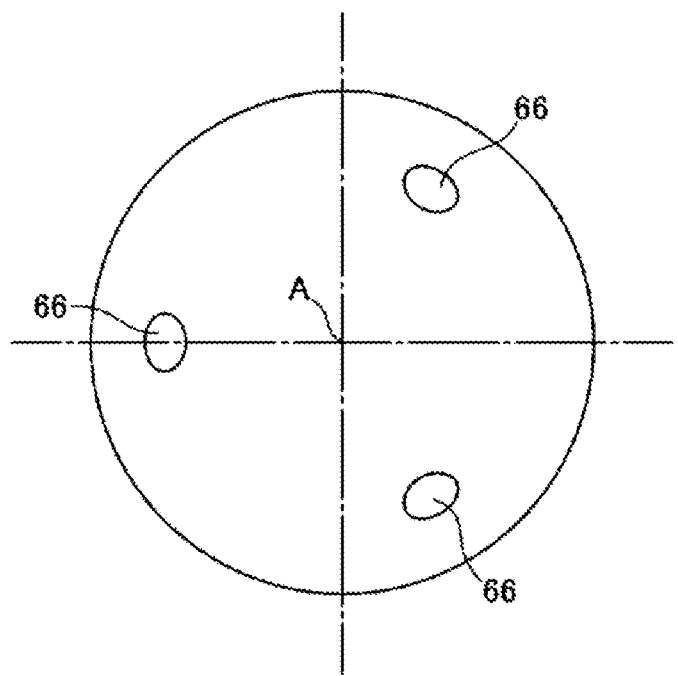

Next, the pre-chamber plug 30 is described with reference to FIG. 4. FIGS. 4A and 4B are views illustrating the pre-chamber plug according to this embodiment, where FIG. 4A is a partial cross-sectional view of the auxiliary chamber and the auxiliary ignition plug of the pre-chamber plug when seen from the side, and FIG. 4B is a plan view of the auxiliary chamber of the pre-chamber plug when seen from below in the axial direction. First, as illustrated in FIG. 4A, the auxiliary chamber 60 is formed in that tip-end part of the pre-chamber plug 30, and the auxiliary ignition plug 62 is provided inside the auxiliary chamber 60. The auxiliary ignition plug 62 has a center electrode 62a and a side electrode (ground) 62b, similar to the main ignition plug 32.

Although the auxiliary chamber 60 is provided inside the main combustion chamber 26, mixture gas inside the auxiliary chamber 60 is combustible independently from the main combustion chamber 26. In detail, it functions as an auxiliary combustion chamber in which mixture gas inside the auxiliary chamber 60 is ignited by the auxiliary ignition plug 62 to produce flame propagation inside the auxiliary chamber 60.

Next, as illustrated in FIGS. 4A and 4B, the auxiliary chamber 60 is formed by a hemispherical auxiliary chamber forming part 64 having a given diameter and a given thickness (in this embodiment, 5-mm radius and 1-mm thickness). A plurality of communicating holes (nozzle holes) 66 which communicate with the main combustion chamber 26 are formed in the auxiliary chamber forming part 64.

These communicating holes 66 are formed, first, in order to make the mixture gas inside the main combustion chamber 26 flow into the auxiliary chamber 60, and, second, in order to ignite the mixture gas flowed into the auxiliary ignition plug 62, and make combustion propagation generated inside the auxiliary chamber 60 blowout/radiate to the main combustion chamber 26 as flame, and thereby, the combustion propagation of the mixture gas inside the main combustion chamber 26 is accelerated. Fundamentally, when the EGR valve 46 is closed, the mixture gas is a mixture gas comprised of fresh air from the intake port 8 and fuel injected from the injector 28, and when the EGR valve 46 is opened, it is a mixture gas comprised of fresh air from the intake port 8, exhaust gas from the EGR passage 42, and fuel injected from the injector 28.

In this embodiment, in the plan view when seen from below as illustrated in FIG. 4B, three communicating holes 66 are formed equally at 120° around an axis passing through a vertex A of the auxiliary chamber forming part 64, and each diameter is $\varphi 1.2$ mm. Moreover, as illustrated in FIG. 4A, in the side view, each communicating hole 66 is formed so as to extend in a 45° direction at a 45° position from the vertex A of the auxiliary chamber forming part 64, and therefore, the flame blows out from the communicating hole 66 at the angle of 45° with respect to the axis.

Note that as will be described later, the number, diameter, and positions of the communicating holes 66 are not limited to these numerals, and, for example, two communicating holes may be formed with a 180°-spacing therebetween, and the diameter may be $\varphi 1.0$ mm, in the plan view when seen from below. Thus, as the number of communicating holes 66 is lessened and/or the diameter is reduced, the flame blowing off from the communicating holes 66 to the main combustion chamber 26 is strengthened. Further, when the flame blowing off is strengthened in this way, since the combustion propagation inside the main combustion chamber 26 is accelerated accordingly, the mixture gas inside the main combustion chamber 26 can be leaner, and thermal efficiency of the engine 2 can be improved.

Note that the number and diameter of communicating holes 66 can be changed in advance, when setting a threshold of the engine speed in an engine control map (described later). In other words, as the number and diameter of communicating holes 66 are changed, the suitable threshold of the engine speed in the engine control map can be changed.

Figure 5:
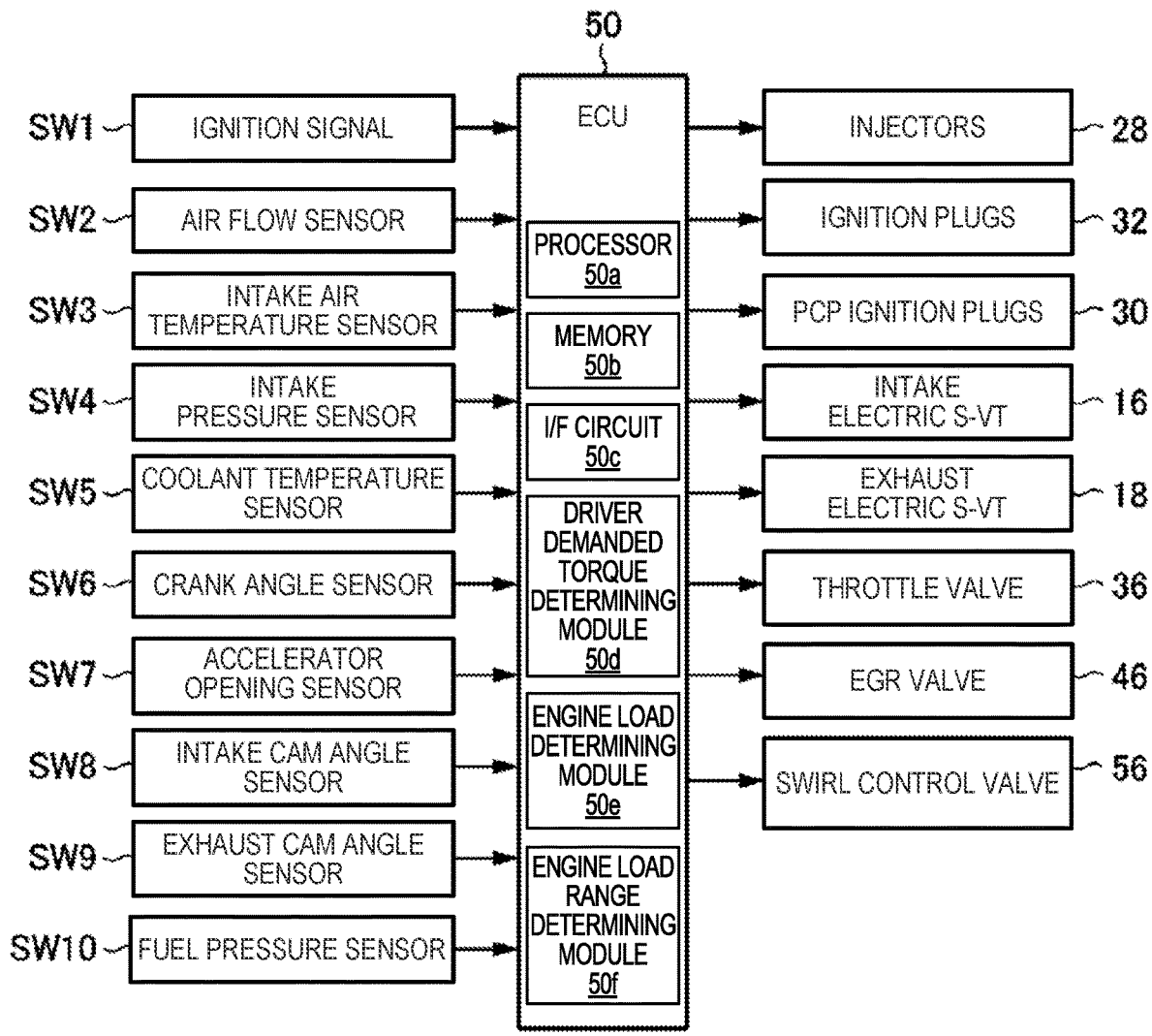
FIG. 5 is a control block diagram illustrating a control device of the engine according to this embodiment of the present disclosure.

Next, a control block of the control device of the engine according to this embodiment of the present disclosure is described with reference to FIG. 5. FIG. 5 is a control block diagram of the control device of the engine according to this embodiment of the present disclosure. As illustrated in FIG. 5, the ECU 50 (see FIG. 1) which controls the engine system 1 has a microprocessor 50a, memory 50b, and an interface (I/F) circuit 50c, and controls the fuel injection timing, the ignition timing, the air-fuel ratio, and the strength of the swirl flow of the engine 2 based on an ignition signal SW1 and output signals from various sensors SW2-SW10 (described later). Note that the sensors SW2-SW10 are known, and therefore, illustration is omitted in FIGS. 1 and 2. The ECU 50 further comprises a driver demanded torque determining module 50d configured to determine a demanded torque of the driver based on the accelerator opening detected by the accelerator opening sensor SW7, an engine load determining module 50e configured to determine a load of the engine based on the driver's demanded torque determined by the driver demanded torque determining module 50d, an engine load range determining module 50f configured to determine whether the engine load determined by the engine load determining module 50e is within a given load range. These modules are executed by the processor 50a to perform their respective functions and are stored as software in the memory 50b.

In detail, an ignition output signal indicative of a command of an engine startup (SW1), an output signal related to an amount of intake air from an air flow sensor SW2 provided in the intake passage 4, an output signal related to an intake-air temperature from an intake air temperature sensor SW3 provided in the intake passage 4, an output signal related to an intake pressure from an intake pressure sensor SW4 provided in the intake passage 4, an output signal related to a coolant temperature from a coolant temperature sensor SW5 provided to the cylinder head 54, an output signal related to a crank angle from a crank angle sensor SW6 provided to the crankshaft 20, an output signal related to an opening of the accelerator pedal from an accelerator opening sensor SW7, an output signal related to an intake-side cam angle from an intake cam angle sensor SW8 provided to an intake cam shaft (not illustrated), an output signal related to an exhaust-side cam angle from an exhaust cam angle sensor SW9 provided to an exhaust cam shaft (not illustrated), and an output signal related to a combustion pressure inside the main combustion chamber 26 from a fuel pressure sensor SW10 provided to the cylinder head 54, are inputted into the ECU 50.

Here, the output signal related to the opening of the accelerator pedal is a signal for outputting a numerical value corresponding to the stepping amount of the accelerator pedal by the driver. This signal is used by the ECU 50 for determining the demanded torque of the driver, and determining the load of the engine 2 (a target output torque/a target engine torque), and engine operating ranges ("an engine low-and-middle-load range", "an engine high-load low-speed range", and "an engine high-load range at or above a given engine speed," which are illustrated in the control map of FIG. 6), based on the demanded torque of the driver.

The ECU 50 controls the fuel injection timing by the injector 28 based on these output signals. Moreover, the ECU 50 controls the ignition timings by the main ignition plug 32 and the auxiliary ignition plug 62 inside the pre-chamber plug 30 (PCP ignition plug). Moreover, mainly, the ECU 50 controls an amount of intake air into the main combustion chamber 26 by controlling the variable valve lift mechanism 16 at the intake side (intake electric S-VT), and the throttle valve 36, and controls the air-fuel ratio inside the main combustion chamber 26 by controlling the fuel injection timing and the fuel injection amount by the injector 28. In this embodiment, the air-fuel ratio is mainly controlled by the control of the fuel injection timing. Note that in connection with the control of the air-fuel ratio, the variable valve lift mechanism 18 at the exhaust side (exhaust electric S-VT) and the EGR valve 46 are also controlled in order to reduce NOR. Moreover, the ECU 50 controls the strength of the swirl flow by the swirl control valve 56.

Figure 6:
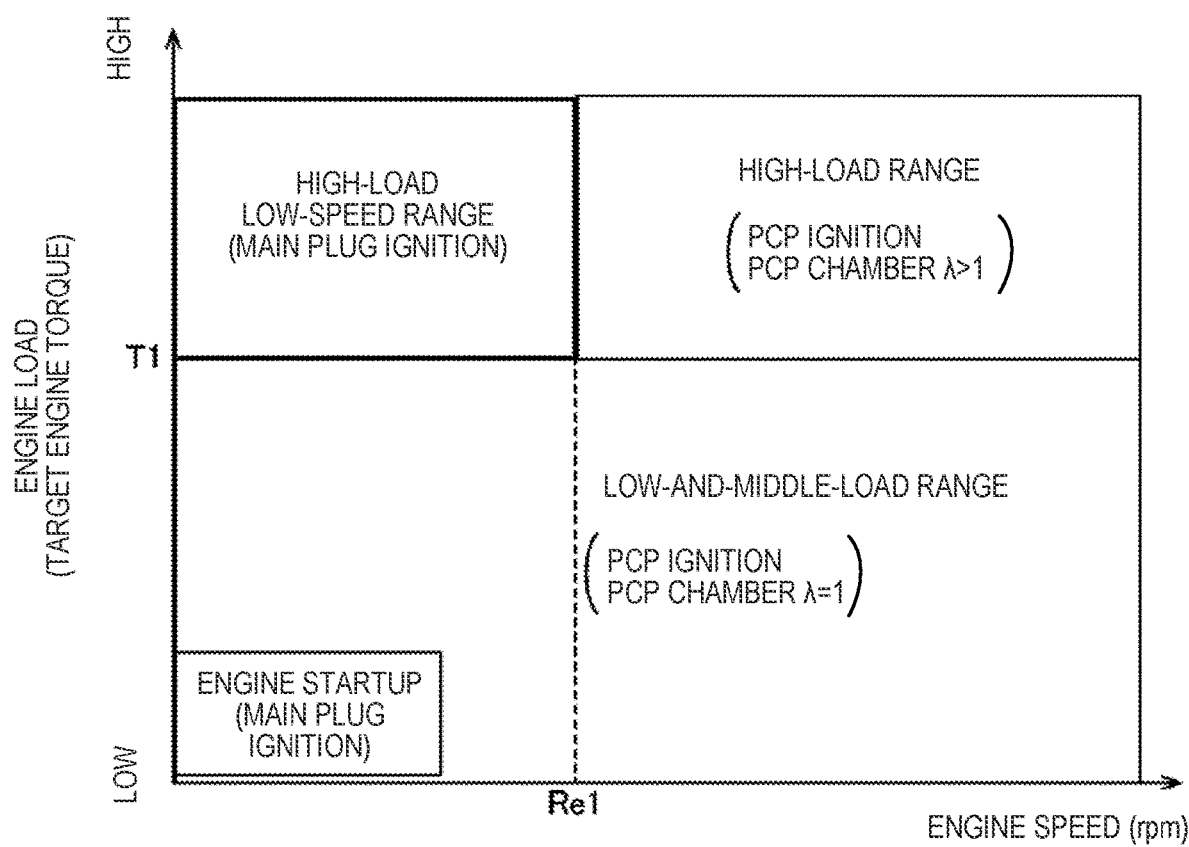
FIG. 6 is an engine control map which is set according to an engine load and an engine speed, which is used by the control device according to this embodiment of the present disclosure.

Next, the engine control map set according to the engine load and the engine speed, which is used by the control device of the engine according to this embodiment of the present disclosure is described with reference to FIG. 6. FIG. 6 is the engine control map set according to the engine load and the engine speed, for the control device according to this embodiment of the present disclosure. The engine control map is stored in the memory 50b of the ECU 50, and the ECU 50 controls the engine 2 based on the control map. Here, in FIG. 6, the engine load of the vertical axis is the target engine torque, and the horizontal axis is the engine speed. The ECU 50 controls the engine 2 while referring to the control map based on the target engine torque calculated based on the output signal from the accelerator opening sensor SW7, and the engine speed (rpm) of the engine 2 calculated based on the output signal from the crank angle sensor SW6. Below, the content of the engine control setting in the control map to which the ECU 50 refers, and a method of controlling the engine 2 by the ECU 50 are described concretely.

First, as illustrated in FIG. 6, the engine control map of this embodiment is set so that the ignition is performed only by the main ignition plug 32 during an engine startup. In more detail, the ECU 50 is set so that, when the ignition output signal SW1 is inputted into the ECU 50 and it is determined to be an engine startup, the main ignition plug 32 ignites the mixture gas inside the main combustion chamber 26. The mixture gas inside the main combustion chamber 26 during an engine startup is a stoichiometric air-fuel ratio ($\lambda=1$). At this time, the auxiliary ignition plug 62 of the pre-chamber plug 30 does not ignite inside the auxiliary chamber 60.

Next, as illustrated in FIG. 6, in the engine control map of this embodiment, the air-fuel ratio of the mixture gas inside the main combustion chamber 26 is set as the stoichiometric air-fuel ratio ($\lambda=1$) in the engine load range with low to middle load which is lower than a given engine load T1 (hereinafter, referred to as "the low-and-middle-load range"), and the air-fuel ratio of the mixture gas which flows into the auxiliary chamber 60 of the pre-chamber plug 30 is set as the stoichiometric air-fuel ratio. Moreover, in this range, it is set that only the ignition by the auxiliary ignition plug 62 of the pre-chamber plug 30 is performed.

Figure 11:
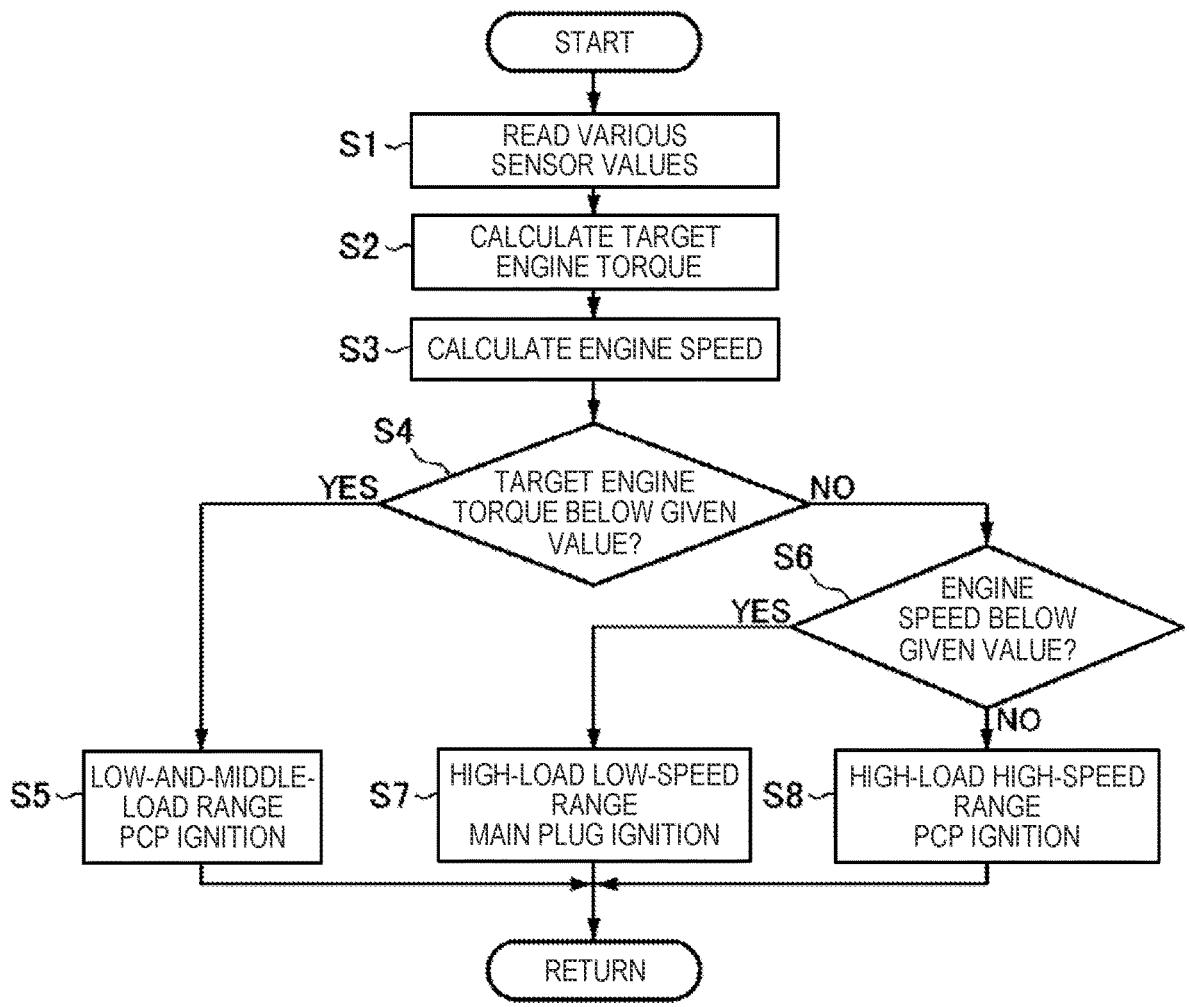
FIG. 11 is a flowchart illustrating an engine control based on the engine control map by the control device of the engine according to this embodiment of the present disclosure.

When the engine 2 is operated, the ECU 50 determines, based on such a control map, whether the engine 2 operates in the low-and-middle-load range according to the target engine torque determined based on the output signal from the accelerator opening sensor SW7 (see FIG. 11). If it is determined to be in this range, in this embodiment, the ECU 50 mainly controls the fuel injection timing by the injector 28 to control the air-fuel ratios inside the main combustion chamber 26 and the auxiliary chamber 60 of the pre-chamber plug 30 so that the air-fuel ratios become the stoichiometric air-fuel ratio, when ignited. Moreover, the ECU 50 controls a timing at which the mixture gas inside the auxiliary chamber 60 is ignited by the auxiliary ignition plug 62. Concrete fuel injection timing and ignition timing will be described later.

Next, as illustrated in FIG. 6, it is set so that only the ignition by the main ignition plug 32 is performed in the engine load range with high load which is higher than the given engine load T1, and an engine speed range which is lower than a given engine speed Re1 (hereinafter, referred to as "the high-load low-speed range"). In this embodiment, the mixture gas inside the main combustion chamber 26 in this range is set as the stoichiometric air-fuel ratio ($\lambda=1$). In this range, the auxiliary ignition plug 62 of the pre-chamber plug 30 does not ignite the mixture gas inside the auxiliary chamber 60.

When the engine 2 is operated, the ECU 50 determines, based on such a control map, whether the engine 2 operates in the high-load low-speed range according to the target engine torque determined based on the output signal from the accelerator opening sensor SW7 and the engine speed (rpm) of the engine 2 obtained from the crank angle sensor SW6 (see FIG. 11). If it is determined to be in this range, in this embodiment, the ECU 50 mainly controls the fuel injection timing by the injector 28 to control the air-fuel ratio inside the main combustion chamber 26 becomes the stoichiometric air-fuel ratio, when ignited. Moreover, the ECU 50 controls a timing at which the mixture gas inside the main combustion chamber 26 is ignited by the main ignition plug 32. Concrete fuel injection timing and ignition timing will be described later.

Next, as illustrated in FIG. 6, in the engine load range with high load which is higher than the given engine load T1, and the high speed range which is higher than the given engine speed Re1 (hereinafter, referred to as "the high-load high-speed range"), the mixture gas inside the main combustion chamber 26 is set as the mixture gas leaner than the stoichiometric air-fuel ratio ($\lambda>1$), and the air-fuel ratio of the mixture gas which flows into the auxiliary chamber 60 of the pre-chamber plug 30 is set as the air-fuel ratio leaner than the stoichiometric air-fuel ratio (λ>1). Moreover, in this high-load high-speed range, it is set so that ignition only by the auxiliary ignition plug 62 of the pre-chamber plug 30 is performed.

When the engine 2 is operated, the ECU 50 determines, based on such a control map, whether the engine 2 operates in the high-load high-speed range according to the target engine torque determined based on the output signal from the accelerator opening sensor SW7 (see FIG. 11). If it is determined to be in this range, in this embodiment, the ECU 50 mainly controls the fuel injection timing by the injector 28 to control the air-fuel ratios inside the main combustion chamber 26 and the auxiliary chamber 60 of the pre-chamber plug 30 so that the air-fuel ratios become leaner than the stoichiometric air-fuel ratio. Moreover, the ECU 50 controls the timing at which the mixture gas inside the auxiliary chamber 60 is ignited by the auxiliary ignition plug 62. Concrete fuel injection timing and ignition timing will be described later.

Here, in the embodiment, in the control map illustrated in FIG. 6, the given engine load (target engine torque) T1 used as a boundary between the low-and-middle-load range and the high-load low-speed range and the boundary between the low-and-middle-load range and the high-load high-speed range is set as 70% (T1=70%) of the maximum engine load (100%). Note that as a modification, a numerical value other than 70% may be set according to the engine specification.

Moreover, in this embodiment, in the control map illustrated in FIG. 6, the given engine speed Re1 used as the boundary between the high-load low-speed range and the high-load high-speed range is set as 3,000 rpm. Note that as a modification, the engine speed used as this boundary may be set as, for example, 1,000 rpm, corresponding to the number and the diameter of communicating holes 66 of the auxiliary chamber 60 described above.

Figure 7:
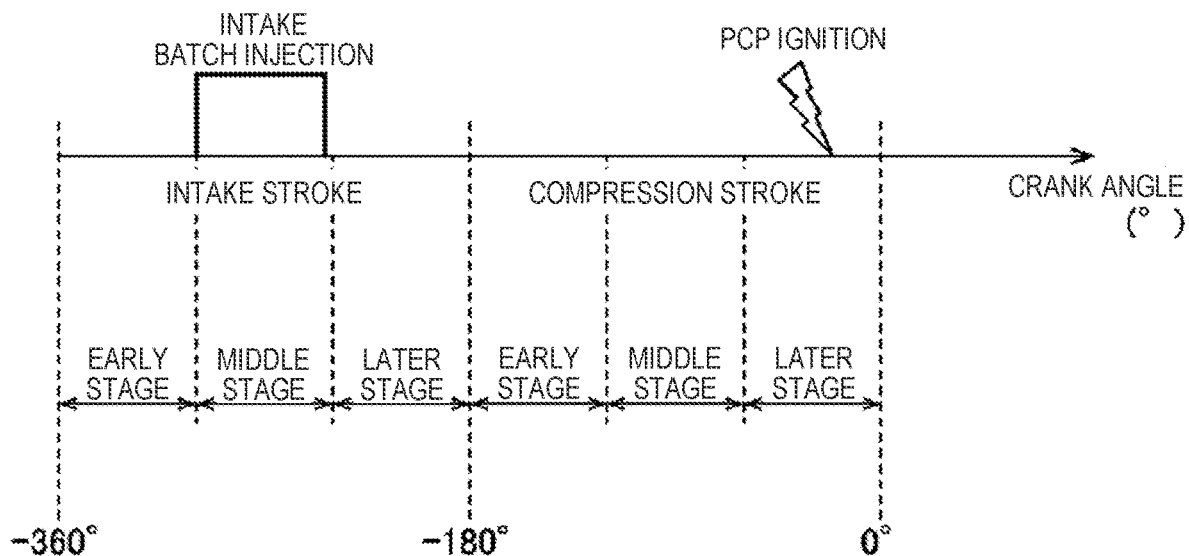
FIG. 7 is a time chart illustrating a fuel injection timing and an ignition timing controlled by the control device of the engine according to this embodiment of the present disclosure, which illustrates one example of the time chart in a low-and-middle-load range in the engine control map illustrated in FIG. 6.
Figure 8:
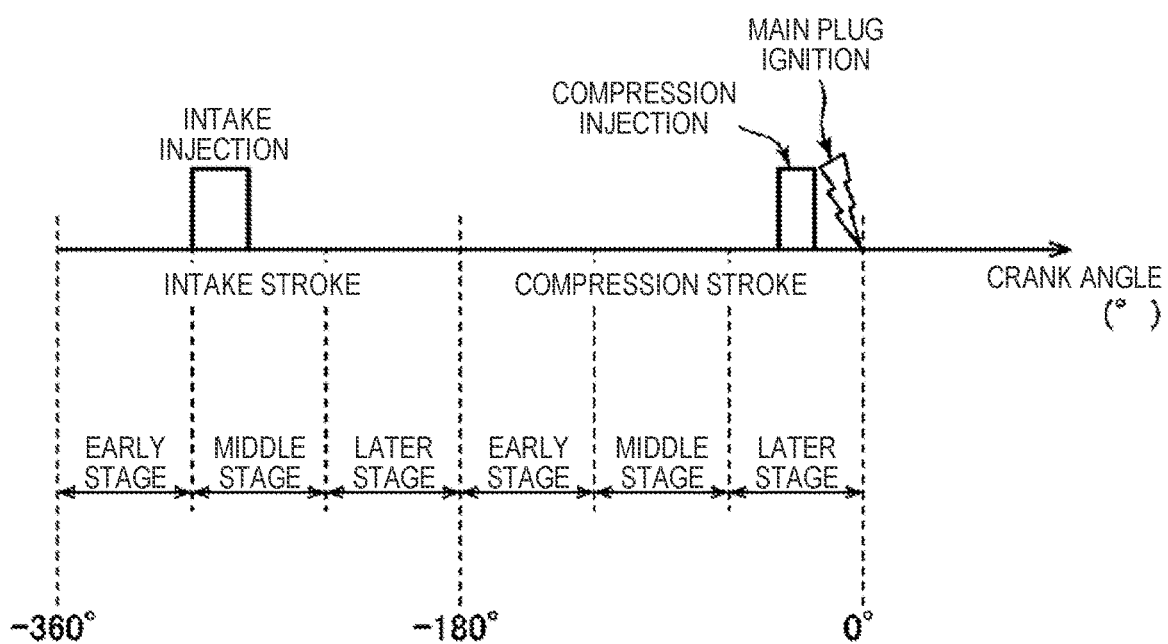
FIG. 8 is a time chart illustrating the fuel injection timing and the ignition timing controlled by the control device of the engine according to this embodiment of the present disclosure, which illustrates one example of the time chart in a high-load low-speed range in the engine control map illustrated in FIG. 6.
Figure 9:
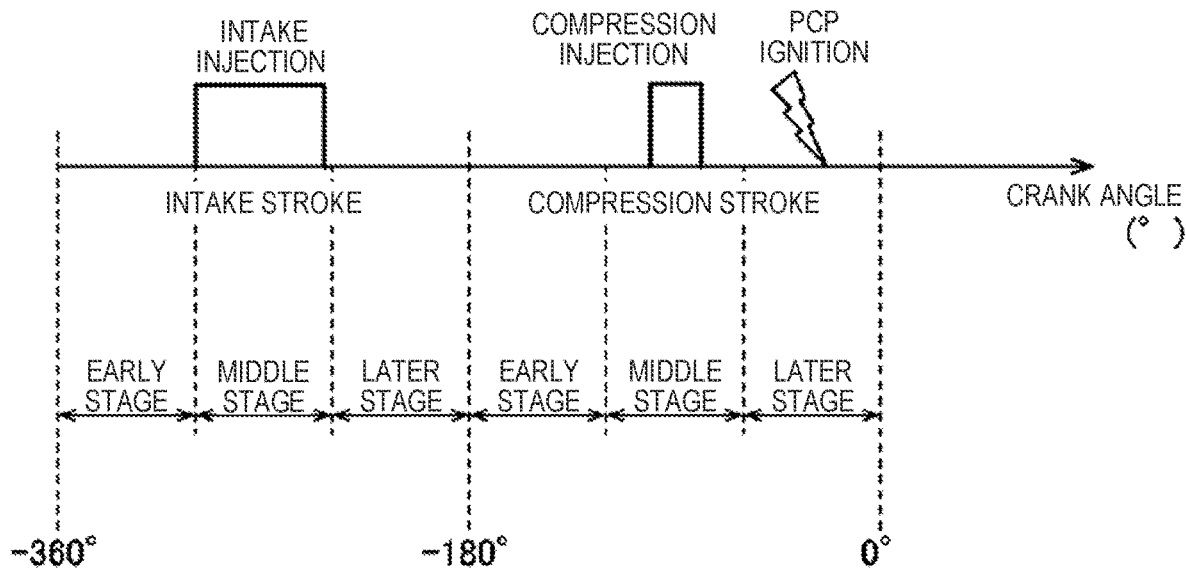
FIG. 9 is a time chart illustrating the fuel injection timing and the ignition timing controlled by the control device of the engine according to this embodiment of the present disclosure, which illustrates one example of the time chart in a high-load high-speed range in the engine control map illustrated in FIG. 6.
Figure 10:
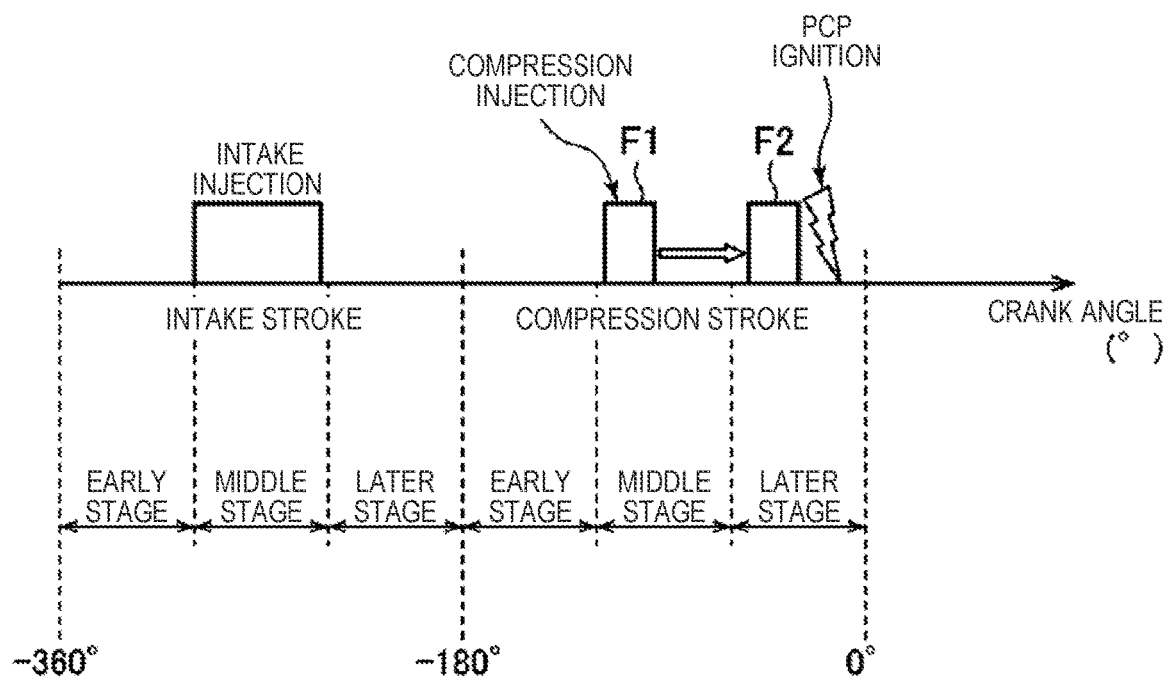
FIG. 10 is a time chart illustrating the fuel injection timing and the ignition timing controlled by the control device of the engine according to this embodiment of the present disclosure, which illustrates one example of the time chart in which a change in the fuel injection timing according to the engine load in the high-load high-speed range in the engine control map illustrated in FIG. 6 is explained.

Next, the fuel injection timing and the ignition timing which are controlled by the control device of the engine according to this embodiment of the present disclosure are described with reference to FIGS. 7 to 10. FIGS. 7 to 10 illustrate one example of a time chart of the fuel injection timing and the ignition timing which are controlled by the control device of the engine according to this embodiment of the present disclosure, where FIG. 7 is a chart illustrating one example of a fundamental time chart in the low-and-middle-load range in the engine control map illustrated in FIG. 6, FIG. 8 is a chart illustrating one example of a fundamental time chart in the high-load low-speed range in the engine control map illustrated in FIG. 6, FIG. 9 is a chart illustrating one example of a time chart in the high-load high-speed range in the engine control map illustrated in FIG. 6, and FIG. 10 is a time chart of the fuel injection timing and the ignition timing which are controlled by the control device of the engine according to this embodiment of the present disclosure, which illustrates one example of the time chart for explaining a change in the fuel injection timing according to the engine load in the high-load high-speed range in the engine control map illustrated in FIG. 6.

First, as illustrated in FIG. 7, in this embodiment, a batch fuel (all fuel) injection is performed in the low-and-middle-load range, at a given timing in a middle stage of an intake stroke (crank angle=−300° to −240°). Note that such a fuel injection timing is not limited to the middle stage of the intake stroke, but may be a period from a given timing in an early stage of the intake stroke to a given timing in the middle stage of the intake stroke, or a period from a given timing in the middle stage of the intake stroke to a given timing in a later stage of the intake stroke, as long as fuel can be mixed with air in the intake stroke to adjust the mixture gas to the stoichiometric air-fuel ratio, and the mixture gas at the stoichiometric air-fuel ratio can flow into the auxiliary chamber 60 in the compression stroke.

Moreover, as illustrated in FIG. 7, in this low-and-middle-load range, ignition to the mixture gas inside the auxiliary chamber 60 by the auxiliary ignition plug 62 of the pre-chamber plug 30 (hereinafter, referred to as "the PCP ignition") is performed in a later stage of the compression stroke before a compression top dead center.

Thus, in this embodiment, the batch fuel injection is fundamentally performed in the middle stage of the intake stroke to mix the fuel with air in the later stage of the intake stroke so that the mixture gas becomes homogeneous. Therefore, in the cylinder 22, the mixture gas at the stoichiometric air-fuel ratio (λ=1) is formed, and the mixture gas at the stoichiometric air-fuel ratio then flows into the auxiliary chamber 60 of the pre-chamber plug 30 in the compression stroke. Then, when the ignition timing which is set comes, the mixture gas flowed into the auxiliary chamber 60 is ignited by the auxiliary ignition plug 62, and the flame propagation generated inside the auxiliary chamber 60 is blown off/radiated to the main combustion chamber 26 as flame, thereby accelerating the flame propagation of the mixture gas inside the main combustion chamber 26.

Next, as illustrated in FIG. 8, in this embodiment, in the high-load low-speed range, fuel is injected at the given timing in the middle stage of the intake stroke, and fuel is further injected at least at the given timing in the second half of the compression stroke, immediately before the ignition timing. In this embodiment, this fuel injection timing is set within a range in the second half of the compression stroke immediately before the ignition timing. Such a fuel injection timing in this embodiment is a crank angle at which pre-ignition near the top dead center immediately before the ignition timing is assumed to occur.

Moreover, as illustrated in FIG. 8, in this high-load low-speed range, ignition to the mixture gas inside the main combustion chamber 26 by the main ignition plug 32 (hereinafter, referred to as "the main plug ignition") is performed around the compression top dead center.

Thus, in this embodiment, the fuel is injected at the timing in the second half of the later stage of the compression stroke (i.e., at the crank angle where the pre-ignition immediately before the ignition timing is assumed to occur). Therefore, the temperature increase of the main combustion chamber 26 is suppressed by the fuel injection to suppress the occurrence of the pre-ignition. Moreover, in this embodiment, since the divided injection is performed in the compression stroke immediately before the ignition timing, the time for mixing the fuel injected in the compression stroke with the air inside the main combustion chamber 26 becomes difficult to be secured, and, accordingly, the mixture gas flowing into the auxiliary chamber 60 becomes too lean to induce a misfire, the mixture gas inside the main combustion chamber 26 is ignited by the main ignition plug 32 to secure the combustion.

Next, as illustrated in FIG. 9, in this embodiment, in the high-load high-speed range, fuel is injected at a given timing in a middle stage of an intake stroke, and fuel is further injected at a given timing in a middle stage of a compression stroke (−120° to −60°). Note that such a fuel injection timing is not limited to the middle stage the intake stroke and/or the middle stage of the compression stroke, but it may be a timing at which lean mixture gas which is combustible flows into the auxiliary chamber 60, when ignited.

Moreover, as illustrated in FIG. 9, in this high-load high-speed range, ignition of the mixture gas inside the auxiliary chamber 60 is performed by the auxiliary ignition plug 62 of the pre-chamber plug 30 in the later stage of the compression stroke.

Thus, in this embodiment, since the divided injection is performed to inject a part of the total injection amount of fuel into the main combustion chamber 26 in the compression stroke, the mixture gas inside the main combustion chamber 26 which is mixed with air by the ignition timing can be made leaner by the reduced fuel injection amount in the intake stroke, and the lean mixture gas can flow into the auxiliary chamber 60. In this case, the fuel injected in the compression stroke generates a lesser amount of mixture gas because of the short mixing time, and therefore, the mixture gas entering into the auxiliary chamber 60 becomes less. This also makes the mixture gas inside the auxiliary chamber 60 leaner ($\lambda > 1$). Then, when the mixture gas inside the auxiliary chamber 60 is ignited by the auxiliary ignition plug 62, the flame propagation of the burnt mixture gas inside the auxiliary chamber 60 becomes slower as the mixture gas becomes leaner than the stoichiometric air-fuel ratio. Further, the momentum of the flame blown off from the communicating holes 66 of the auxiliary chamber 60 becomes weaker as the flame propagation inside the auxiliary chamber 60 becomes slower. Thus, in this embodiment, the combustion propagation inside the main combustion chamber 26 is made slower in the high-load high-speed range.

In other words, in this high-load high-speed range, the powerful flame blow out from the auxiliary chamber 60 is suppressed by making the mixture gas inside the auxiliary chamber 60 leaner. Therefore, in this embodiment, the abnormal combustion, in which the combustion propagation inside the main combustion chamber 26 becomes abnormally quicker and the pipe resonance (near 1.5 kHz, 3 to 4 kHz, and 6 to 7 kHz, etc.) at high frequency is excited in the space (pipe or air column) of the main combustion chamber 26, is suppressed.

Next, as illustrated in FIG. 10, in the high-load high-speed range, the fuel injection timing is changed according to the engine load (target engine torque). In more detail, in this embodiment, although the fuel injection timing in the intake stroke is not changed, the fuel injection timing in the compression stroke is retarded as the engine load increases. In more detail, in this embodiment, when the engine load is at the boundary with the low-and-middle-load range (the engine load T1=70%), fuel is injected at a fuel injection timing as illustrated by F1 in FIG. 10, and the fuel injection timing is then retarded to F2 as illustrated in FIG. 10 as the engine load increases. Thus, in this embodiment, in the high-load high-speed range, the fuel injection timing is retarded from the middle stage of the compression stroke to the later stage of the compression stroke as the engine load increases.

Moreover, in this high-load high-speed range, the timing of igniting the mixture gas inside the auxiliary chamber 60 is retarded toward the timing around the compression top dead center as the engine load increases, similar to the retarding of the fuel injection timing according to the engine load as described above.

Moreover, in this high-load high-speed range, the swirl control valve 56 as illustrated in FIG. 3 is controlled so that the swirl flow inside the main combustion chamber 26 becomes stronger. This embodiment utilizes that the mixture gas flows in a part more radially outward of the main combustion chamber 26 and the piston 24 as the swirl flow inside the main combustion chamber 26 is stronger, and therefore, the mixture gas becomes more difficult to flow in the center area of the main combustion chamber 26 and the piston 24 (see FIG. 13 described later). Here, in this embodiment, as described above, the auxiliary chamber 60 of the pre-chamber plug 30 is provided to the center area of the main combustion chamber 26 in the plan view (see FIG. 3). Therefore, in this embodiment, by strengthening the swirl flow inside the main combustion chamber 26, the mixture gas becomes more difficult to flow through the center area to make the mixture gas which flows into the auxiliary chamber 60 provided to the center area leaner.

Next, the control of the engine 2 executed by the ECU 50 based on the engine control map illustrated in FIG. 6 is described with reference to FIG. 11. FIG. 11 is a flowchart illustrating the engine control based on the engine control map executed by the control device of the engine according to this embodiment of the present disclosure. Note that "S" indicates a step in FIG. 11.

First, as illustrated in FIG. 11, the ECU 50 reads the output signals from the accelerator opening sensor SW7 and the crank angle sensor SW6 at S1. Next, the ECU 50 calculates the target engine torque T1 based on the output signal from the accelerator opening sensor SW7 at S2, and then calculates the engine speed based on the output signal from the crank angle sensor SW6 at S3. Next, at S4, the ECU 50 determines whether the target engine torque calculated at S2 is below a given value. In this embodiment, the given value of the target engine torque at S4 is set to 70% as described above.

At S4, if the target engine torque is below the given value (70%) (YES at S4), the ECU 50 determines that the engine operates in the low-and-middle-load range, and then shifts to S5, where the PCP ignition is performed with the mixture gas of $\lambda = 1$. On the other hand, at S4, if the target engine torque is above the given value (70%) (NO at S4), the ECU 50 shifts to S6, where it determines whether the engine speed calculated by S3 is below a given value. In this embodiment, the given value of the engine speed at S6 is set as 3,000 rpm as described above.

At S6, if the engine speed is below the given value (3,000 rpm) (YES at S6), the ECU 50 determines that the engine operates in the high-load low-speed range, and then shifts to S7, where the mixture gas inside the main combustion chamber 26 is ignited by the main ignition plug 32. On the other hand, at S6, if the engine speed is above the given value (3,000 rpm) (NO at S6), the ECU 50 determines that the engine operates in the high-load high-speed range, and then shifts to S8, where the PCP ignition is performed with the mixture gas of $\lambda > 1$.

Figure 12:
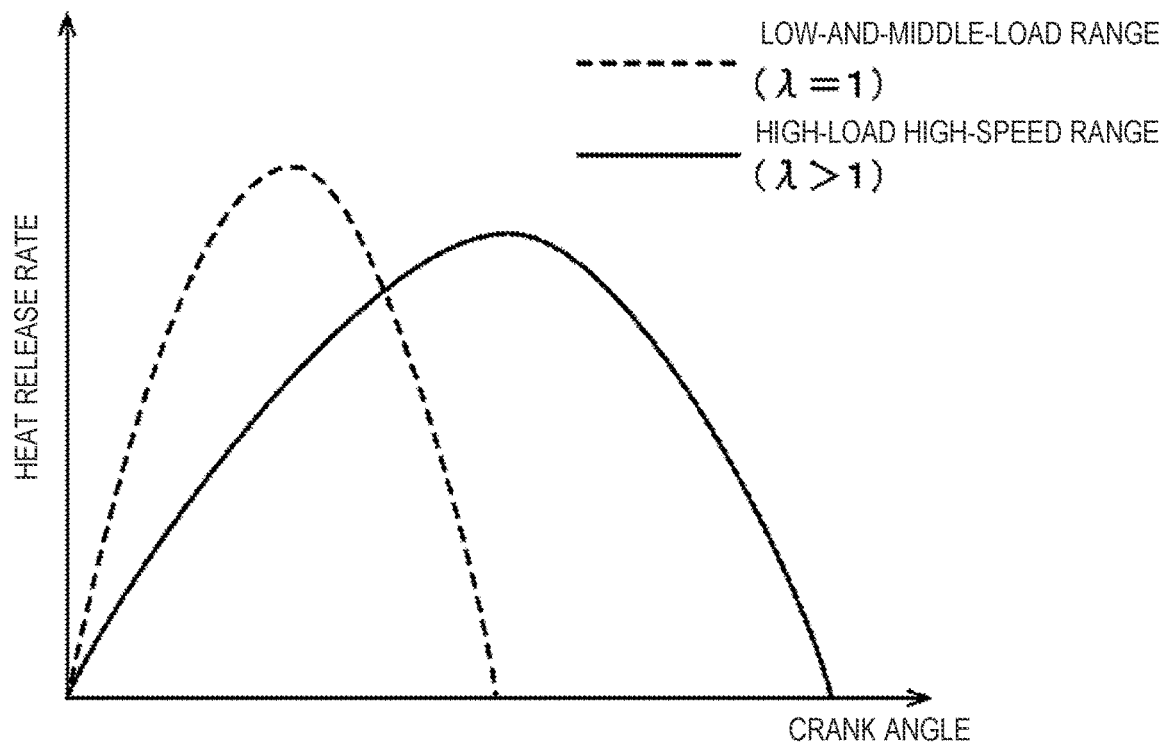
FIG. 12 is a graph illustrating a difference in a rate of heat release in the combustion chamber of the engine, depending on a difference in the air-fuel ratio controlled by the control device of the engine according to this embodiment of the present disclosure.

Next, main operation and effects of the control device of the engine according to this embodiment of the present disclosure is described. First, the control device (ECU) 50 of the engine 2 of the engine system 1 according to this embodiment of the present disclosure makes the mixture gas inside the auxiliary chamber 60 leaner (second air-fuel ratio) in the high-load high-speed range (second load range) of the engine 2 than the air-fuel ratio (first air-fuel ratio) of the mixture gas inside the auxiliary chamber 60 in the low-and-middle-load range (first load range). Thus, when the engine load (target engine torque/driver demanded torque) is high, the flame propagation of the mixture gas ignited inside the auxiliary chamber 60 becomes slower, and the momentum of the flame blown off from the communicating holes 66 of the auxiliary chamber 60 becomes weaker as the flame propagation becomes slower. Therefore, the combustion propagation inside the main combustion chamber 26 can be made slower by the flame blown off from the communicating holes 66 of the auxiliary chamber 60, thereby suppressing the abnormal combustion inside the main combustion chamber 26. For example, as illustrated in FIG. 12, as compared with a rising of a rate of heat release inside the main combustion chamber 26 when the mixture gas at the stoichiometric air-fuel ratio ($\lambda=1$) is combusted in the low-and-middle-load range, the rising of the rate of heat release becomes slower and the maximum value of the rate of heat release becomes lower by making the combustion propagation slower in the high-load high-speed range where the mixture gas is lean ($\lambda>1$). Therefore, the abnormal combustion inside the main combustion chamber 26 can be suppressed.

Moreover, according to this embodiment, the control device 50 of the engine 2 of the engine system 1 retards the fuel injection timing of the injector 28 in the high-load high-speed range as the engine load increases. Accordingly, the time required for mixing the fuel injected into the main combustion chamber 26 by the injector 28 with the air inside the main combustion chamber 26 becomes shorter, and therefore, the mixture gas which flows into the auxiliary chamber 60 through the communicating holes 66 can be made leaner, when the engine load is high.

Moreover, according to this embodiment, the control device 50 of the engine 2 of the engine system 1 can make the fuel injection amount during the intake stroke in the high-load high-speed range less than the fuel injection amount during the intake stroke in the low-and-middle-load range, because of the divided injection. Therefore, it is easier to make the mixture gas which flows into the auxiliary chamber 60 through the communicating holes 66 in the compression stroke leaner, when the engine load is high. Therefore, in the high-load high-speed range, the mixture gas inside the auxiliary chamber 60 can effectively be made leaner.

Figure 13:
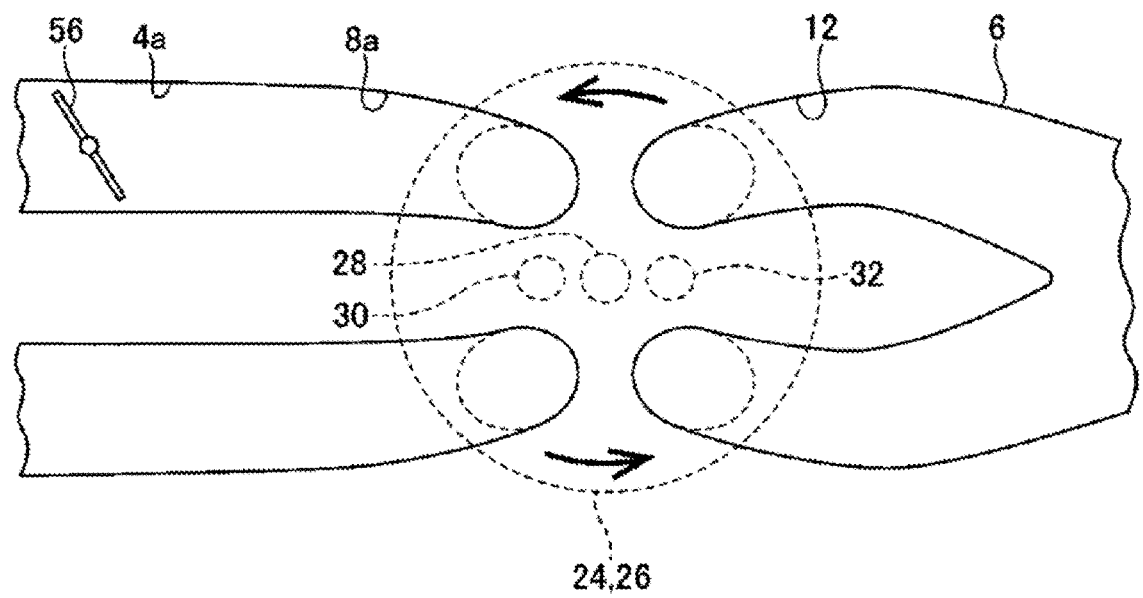
FIG. 13 is a plan view similar to FIG. 3, which illustrates a state where a swirl flow inside the main combustion chamber becomes stronger by a control of a swirl control valve of the engine according to this embodiment.

Moreover, according to this embodiment, the engine 2 has the swirl control valve 56 which generates the swirl inside the main combustion chamber 26. The auxiliary chamber 60 of the pre-chamber plug 30 is provided to the center area of the main combustion chamber 26 in the plan view. The control device 50 of the engine 2 of the engine system 1 controls the swirl control valve 56 so that the swirl flow inside the main combustion chamber 26 becomes stronger in the high-load high-speed range of the engine 2 than in the low-and-middle-load range. Therefore, the mixture gas which flows into the auxiliary chamber 60 provided to the center area of the main combustion chamber 26 can be made leaner more effectively in the high-load high-speed range than in the low-and-middle-load range. That is, as illustrated in FIG. 13, the mixture gas flows in the part radially outward of the main combustion chamber 26 and the piston 24 as the swirl flow inside the main combustion chamber 26 becomes stronger, and the mixture gas becomes more difficult to flow through the center area of the main combustion chamber 26 and the piston 24, accordingly, the mixture gas which flows into the auxiliary chamber 60 provided to the center area of the main combustion chamber 26 can effectively be made leaner.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
2 Engine
8 Intake Port
10 Intake Valve
12 Exhaust Port
14 Exhaust Valve
16, 18 Variable Valve Lift Mechanism
22 Cylinder
24 Piston
26 Main Combustion Chamber
30 Pre-chamber Plug
32 Main Ignition Plug
50 ECU (Control Device for Engine)
52 Cylinder Block
54 Cylinder Head
56 Swirl Control Valve
60 Auxiliary Chamber of Pre-chamber Plug (PCP)
62 Auxiliary Ignition Plug
66 Communicating Hole/Nozzle Hole

What is claimed is:

1. An engine system, comprising:
an engine having a cylinder head and a piston;
a main combustion chamber formed by the cylinder head and the piston;
an auxiliary chamber provided to the main combustion chamber and formed with a communicating hole communicating with the main combustion chamber;
an injector provided to the engine and configured to inject fuel into the main combustion chamber;
an ignition plug provided to the auxiliary chamber and configured to ignite a mixture gas inside the auxiliary chamber;
an accelerator opening sensor configured to detect an accelerator opening; and
a control device configured to control the injector in response to an output signal from the accelerator opening sensor, the control device including a processor configured to execute:
a driver demanded torque determining module to determine a demanded torque of a driver based on the accelerator opening detected by the accelerator opening sensor;
an engine load determining module to determine a load of the engine based on the driver's demanded torque determined by the driver demanded torque determining module; and
an engine load range determining module to determine whether the engine load determined by the engine load determining module is within a given load range,
wherein the control device controls the injector so that:
an air-fuel ratio of the mixture gas inside the auxiliary chamber becomes a first air-fuel ratio, when the engine load range determined by the engine load range determining module is a first load range, and
the air-fuel ratio of the mixture gas inside the auxiliary chamber becomes a second air-fuel ratio leaner than the first air-fuel ratio, when the engine load range determined by the engine load range determining module is a second load range where the engine load is higher than in the first load range.

2. The engine system of claim 1, wherein the control device controls the injector in the second load range so that a fuel injection timing of the injector is retarded as the engine load increases.

3. The engine system of claim 2, wherein the control device controls the injector so that fuel is injected only during an intake stroke in the first load range, and fuel is injected dividedly during an intake stroke and a compression stroke in the second load range.

4. The engine system of claim 3, wherein the control device controls the injector in the second load range so that the fuel injection timing in the compression stroke by the injector is retarded as the engine load increases.

5. The engine system of claim 4,
wherein the engine includes a swirl control valve configured to generate a swirl inside the main combustion chamber,
wherein the auxiliary chamber is provided to a center area of the main combustion chamber in a plan view, and
wherein the control device controls the swirl control valve so that a flow of the swirl inside the main combustion chamber becomes stronger in the second load range than in the first load range.

6. The engine system of claim 3,
wherein the engine includes a swirl control valve configured to generate a swirl inside the main combustion chamber,
wherein the auxiliary chamber is provided to a center area of the main combustion chamber in a plan view, and
wherein the control device controls the swirl control valve so that a flow of the swirl inside the main combustion chamber becomes stronger in the second load range than in the first load range.

7. The engine system of claim 2,
wherein the engine includes a swirl control valve configured to generate a swirl inside the main combustion chamber,
wherein the auxiliary chamber is provided to a center area of the main combustion chamber in a plan view, and
wherein the control device controls the swirl control valve so that a flow of the swirl inside the main combustion chamber becomes stronger in the second load range than in the first load range.

8. The engine system of claim 1, wherein the control device controls the injector so that fuel is injected only during an intake stroke in the first load range, and fuel is injected dividedly during an intake stroke and a compression stroke in the second load range.

9. The engine system of claim 8, wherein the control device controls the injector in the second load range so that the fuel injection timing in the compression stroke by the injector is retarded as the engine load increases.

10. The engine system of claim 8,
wherein the engine includes a swirl control valve configured to generate a swirl inside the main combustion chamber,
wherein the auxiliary chamber is provided to a center area of the main combustion chamber in a plan view, and
wherein the control device controls the swirl control valve so that a flow of the swirl inside the main combustion chamber becomes stronger in the second load range than in the first load range.

11. The engine system of claim 1,
wherein the engine includes a swirl control valve configured to generate a swirl inside the main combustion chamber,
wherein the auxiliary chamber is provided to a center area of the main combustion chamber in a plan view, and
wherein the control device controls the swirl control valve so that a flow of the swirl inside the main combustion chamber becomes stronger in the second load range than in the first load range.

12. The engine system of claim 1,
wherein the auxiliary chamber having an auxiliary ignition plug is provided to the main combustion chamber and combusts the mixture gas inside the auxiliary chamber independently from the main combustion chamber,
wherein the control device controls the auxiliary ignition plug to ignite the mixture gas inside the auxiliary chamber so that flame propagation combustion of the mixture gas occurs, and
wherein the combustion propagation generated inside the auxiliary chamber is blown off and radiated into the main combustion chamber as flame.

* * * * *